United States Patent [19]
Mealey et al.

[11] Patent Number: 6,138,243
[45] Date of Patent: Oct. 24, 2000

[54] METHOD AND SYSTEM FOR KEEPING TIME ACROSS A MULTIPROCESSOR PLATFORM

[75] Inventors: Bruce Gerard Mealey; Michael Stephen Williams, both of Austin, Tex.

[73] Assignee: International Business Machines Corporation, Armonk, N.Y.

[21] Appl. No.: 09/078,787

[22] Filed: May 14, 1998

[51] Int. Cl.[7] ........................................... G06F 1/14
[52] U.S. Cl. ........................ 713/400; 713/500; 713/503
[58] Field of Search ................................. 713/400, 500, 713/502, 503, 600

[56] References Cited

U.S. PATENT DOCUMENTS

| | | | |
|---|---|---|---|
| 3,932,847 | 1/1976 | Smith | 340/172 |
| 4,882,739 | 11/1989 | Potash et al. | 375/358 |
| 5,504,878 | 4/1996 | Coscarella et al. | 709/248 |
| 5,530,846 | 6/1996 | Strong | 713/400 |
| 5,701,446 | 12/1997 | Abali et al. | 713/400 |
| 5,907,685 | 5/1999 | Douceur | 709/248 |

*Primary Examiner*—Dennis M. Butler
*Attorney, Agent, or Firm*—Andrea Pair Bryant; Volel Emile

[57] ABSTRACT

A system, method and computer program are provided for maintaining time accurately and synchronously across a plurality of interconnected processors in a data processing system. Each processor has its own time base register and access to a single time delta variable. Time is reported as the sum of a processor's time base register and the time delta variable. Time base registers are set only at system initialization or boot; thereafter, any system wide time changes are effected by changing only the time delta variable value.

19 Claims, 2 Drawing Sheets

METHOD AND SYSTEM FOR KEEPING TIME ACROSS A MULTIPROCESSOR PLATFORM

TECHNICAL FIELD

The present invention relates to keeping accurate, synchronous time in all processors in a multiprocessor system. More particularly, it relates to a method and system for maintaining time in two parts, a time base and a variable which is added to the time base value to arrive at a time value compensating for any drift which may be propagating through the multiprocessor system.

BACKGROUND OF THE INVENTION

In computer systems having interconnected processors and peripheral devices it is important to assure that system time is accurately and synchronously tracked. In systems wherein each processor is provided with associated time keeping hardware, it is desirable to change the time setting in a synchronized manner across all processors in the system. Otherwise it may be that a program or process has differing time values returned to it as it runs on various processors in the system. There may be many reasons for such discrepancies. Most often some change has occurred in the time adjustment of one processor that has not been propagated to the other(s).

In such systems, it is common to use control hardware to inhibit updating the time keeping hardware for a given processor while software makes an adjustment. The process is repeated for each processor in the system at its next control interval. Every processor, having applied the same adjustment to its time keeping hardware (or clock), should have the same clock time value. However, a discrepancy may still arise since a program or process is likely to have interrogated a clock before all processor clocks have been adjusted.

Further difficulty arises from such stop-start operation of clock hardware since processor clocks are not stopped and started evenly, with small variations in elapsed time during adjusting occurring. Therefore, over time and many stop-starts, variances become cumulative.

It is therefore desirable to assure that system time may be kept accurately and synchronously across a plurality of interconnected processors without the shortcomings noted above.

SUMMARY OF THE INVENTION

The present invention provides such assurance. The present invention allows system time to be accurately maintained synchronously across all processors in an interconnected multiprocessor system by separating system time into two components. The first component is the clock hardware in each processor. The second component is a globally accessible area in memory containing a time delta variable. This time delta variable is combined with the time in the clock hardware of a given processor to yield the correct system time. That is, the time clock hardware associated with each processor is the time base with which the time delta is combined.

When a system embodying the present invention is initialized, time base hardware updating is inhibited while each processor in the system writes the same value into its time base and informs the other processors in the system that it has done so. When completion of this write is reported by all processors, time base updating resumes and is not interrupted until the next occurrence of system initialization.

Each time base in the processors comprising the multiprocessor system is incremented at the same rate. When setting system time at system initialization, the current time of day is supplied to the logic controlling the system. The current time may come from a read of time of day (TOD) hardware associated with the system or from some external source such as user input or network connected clock. The value for the time delta variable is calculated by finding the difference between the current time value and the time in the time base clock in any one of the processors comprising the multiprocessor system. This difference is then stored in the time delta variable. Thereafter, any request for system time receives the combined value of the time base and the time delta variable.

When it becomes necessary to effect a time change across all processors in the system, the difference between the new time, from TOD hardware or other external source, and the current time in the time base in any one of the processors is added to or subtracted from the time in the time delta variable. Thus, system time is synchronously changed for the entire system since each processor time base will be combined with the same time delta variable value. Drift associated with non instantaneous time base stop-start time changes in each processor, as in the prior art, is eliminated and all processes or programs running in any of the processors are provided a single view of time.

BRIEF DESCRIPTION OF THE DRAWINGS

The above and other features and advantages of the present invention will be more particularly described in conjunction with the following drawing in which like symbols and numerals are used throughout to indicate the same elements and wherein.

DETAILED DESCRIPTION OF PREFERRED EMBODIMENT

Figure 1:
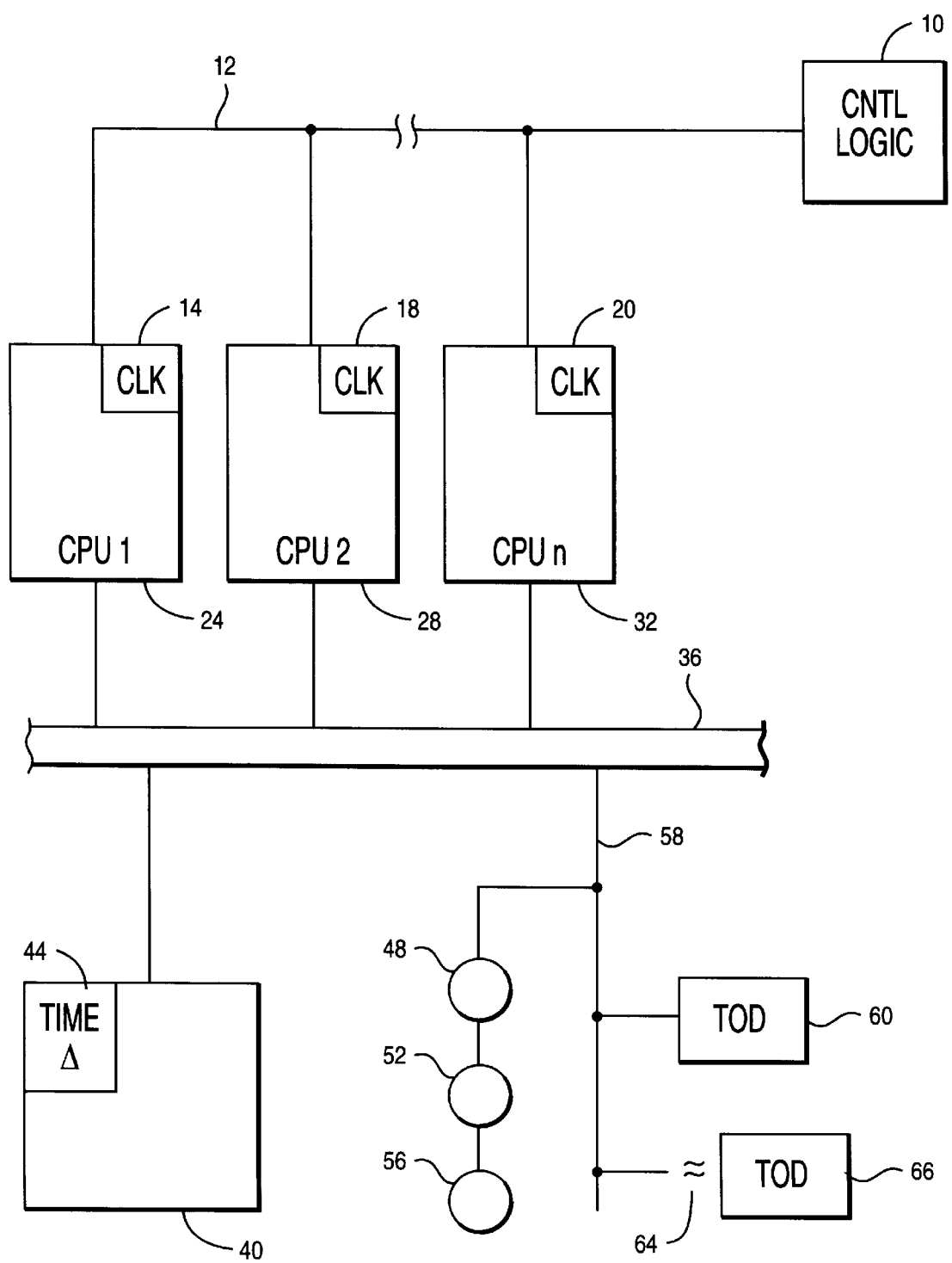
FIG. 1 is a schematic block diagram of a multipressor system in which the present invention may be embodied.

Refer now to FIG. 1 which shows a tightly coupled multiprocessor system which may be part of a network. Control logic 10 includes the present invention. A time clock enable line 12 is connected in parallel to time base clocks 14, 18 and 20 located in processors 24, 28 and 30. Three processors are shown for illustrative purposes, but those skilled in the art will understand that the invention is in no way limited to this number.

System bus 36 interconnects processors 24, 28 and 32 with the remainder of the system which includes system memory 40. A portion of system memory 40 is designated to be time delta variable 44. Other customary peripheral devices 48, 52 and 56 are connected to system bus 36 over bus 58 as is well understood in the art. A time of day (TOD) device 60 may also be connected to system bus 36 over bus 58. One or more network connections 64 may be made via bus 58 to system bus 36 so as to provide additional external information to processors 24, 28 and 32. For example TOD 66 information may come from a source external to the system comprising processors 24, 28 and 32.

In this preferred embodiment the software runs on the IBM AIX 4.3.0 operating system. The processors may be those described more fully in "PowerPC™ Microprocessor Common Hardware Reference Platform A System Architecture" published by Morgan Kaufman Publishers, Inc., 1995.

Figure 2:
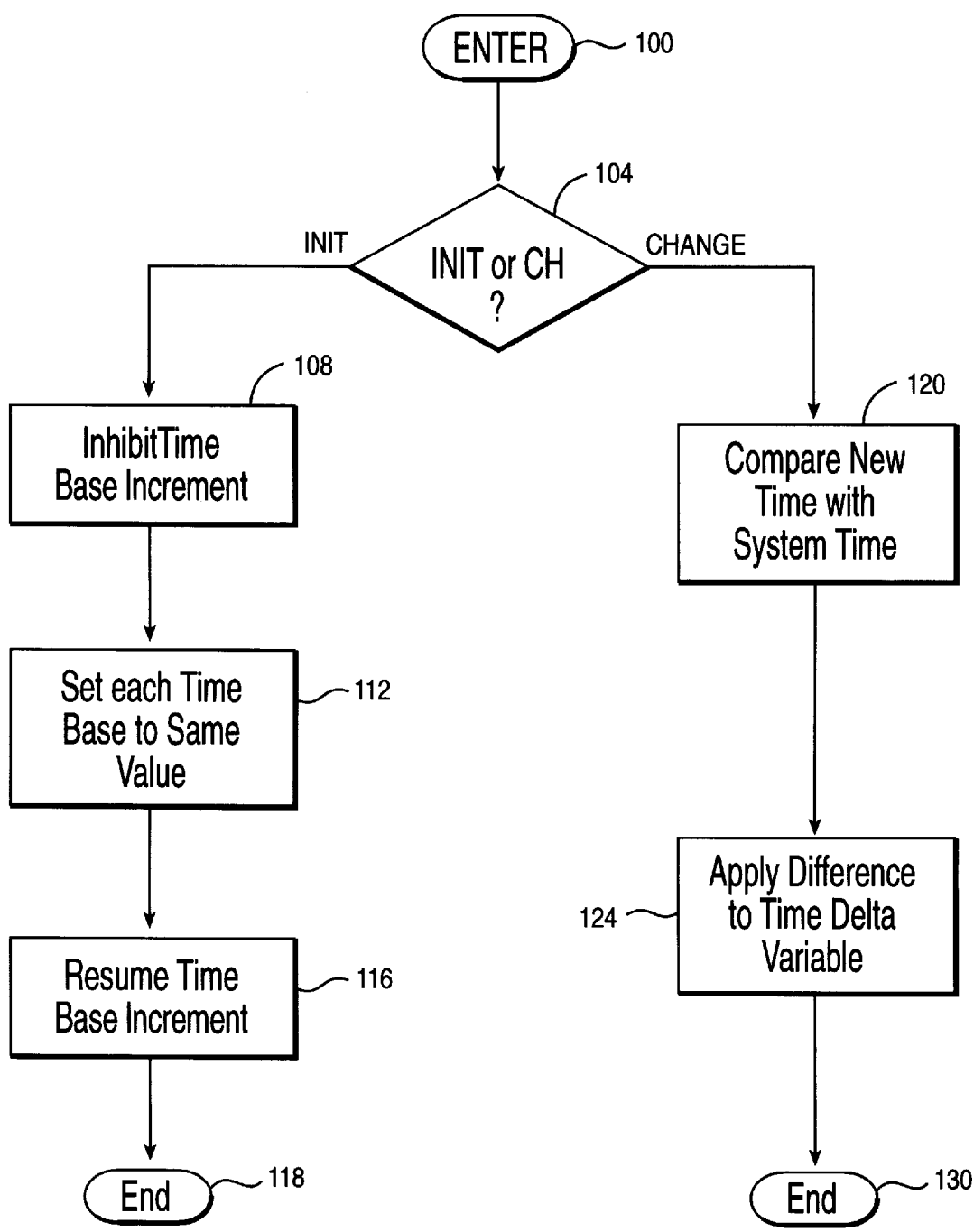
FIG. 2 shows illustrates control logic flow during operation of the present invention.

Referring now to FIG. 2, the logic flow of the present invention is set out. The description of the logic shown in FIG. 2 will be made having reference to certain elements of FIG. 1.

The present invention provides a technique for assuring that processes or programs running in any of the plurality of processors 24, 28 and 32 have the same view of time. This is accomplished by responding to requests for time with a system time having two components, the value in the processor time base, 14, 18 and 20, combined with the value in the time delta variable 44 in system memory 40. Then, whenever system time is to be changed, only the time delta variable is adjusted.

The logic of FIG. 2 is entered at step 100. Upon determining at step 104 whether this is a system initialization or time change the logic branches appropriately. If system initialization is to occur, at step 108 the control logic inhibits incrementing of time bases 14, 18 and 20. At step 112, each time base is set to the same value; and at step 116 incrementing is resumed. Incrementing of time bases 14, 18 and 20 continues until the system is rebooted. Time delta variable 44 is reset to zero each time the system boots. The logic ends at terminal 118. In a modification of the present invention, the logic may be implemented to branch from step 116 immediately upon completion of initialization to step 120 to accomplish a system time change as explained just below.

If system time is to be changed, the logic branches to step 120. There a calculation is made to determine the difference between the new time and the time in any one of the time bases. This difference so determined is put in time delta variable 44. System time is the result of combining the value in the time base with that in the time delta variable 44. The new time is that received from interrogating TOD 60 or TOD 66 or may have been supplied by a user of the system. Then at step 124 the result of the action of step 120 is placed into time delta variable 44. The logic ends at terminal 130.

While the invention has been shown and described having reference to a particular embodiment thereof, it will be understood by those skilled in the art that various changes in form and detail may be made therein without departing from the spirit and scope of the invention as hereinbelow claimed.

What is claimed is:

1. In a data processing system including a plurality of processors and an external source of current time of day, improved time keeping means comprising:
   a time base register means associated with each of said plurality of processors;
   a globally accessible time delta variable; and
   means for responding to time requests in any of said plurality of processors with a system time value equal to the sum of said associated time base register means and said globally accessible time delta variable.

2. The data processing system of claim 1 additionally including
   means for initializing with an equal value each said associated time base register means upon system boot; and
   means for synchronously incrementing each said associated time base register means.

3. The data processing system of claim 2 additionally including:
   means for determining a value for said globally accessible time delta variable.

4. The data processing system of claim 3 wherein said means for determining includes:
   means for obtaining a current time of day value;
   means for calculating the difference between time of day and said associated time base register means; and
   means for storing said difference in said time delta variable.

5. The data processing system of claim 4 wherein said means for determining additionally includes:
   means, active when system time is to be changed, for calculating the difference between time of day and said time base register means value; and
   means for storing said difference in said time delta variable.

6. The data processing system of claim 1 additionally comprising:
   means for setting said time base register means only at system boot;
   means for calculating said time delta variable at system boot; and
   means for altering only said time delta variable when a time change is desired across said system.

7. In a data processing system including system memory and an external source of current time of day and having a plurality of interconnected processors, a method for accurately maintaining time across said system comprising the steps of:
   providing each processor with a time base register for reflecting elapsed time;
   designating a time delta variable in system memory;
   at system initialization,
      inhibiting update of time base registers,
      setting each time base register with an equal value, and
   thereafter resuming update of said time base registers;
   at system time alteration,
      finding the difference between an externally supplied current time and time in said time base register; and
   storing said difference in said time delta variable.

8. In a data processing system including a plurality of processors and access to a time of day clock, an improved time keeping method comprising the steps of:
   associating a time base register means with each of said plurality of processors;
   providing a globally accessible time delta variable; and
   responding to time requests in any of said plurality of processors with a system time value equal to the sum of said associated time base register means and said globally accessible time delta variable.

9. The method of claim 8 including the additional steps of:
   synchronizing said associated time base register means upon system boot; and
   cyclically incrementing each said associated time base register means.

10. The method of claim 9 including the additional steps of:
    determining a value for said globally accessible time delta variable.

11. The method of claim 10 wherein said determining step includes:
    at system initialization, calculating the difference between current time of day and time in said time base registers; and
    storing said difference in said time delta variable.

12. The method of claim 11 wherein said determining step additionally includes:

when system time is to be altered, calculating the difference between current time of day and time in said time base register means; and storing said difference in said time delta variable.

13. The time keeping method of claim 8 additionally comprising the steps of:

setting said time base register means only at system boot;

resetting said time delta variable at system boot; and altering only said time delta variable when a time change is desired across said system.

14. A computer program having data structures included on a computer readable medium which causes time keeping accurately and synchronously across a multiprocessor system comprising:

a time base register means associated with each of said plurality of processors;

a globally accessible time delta variable; and means for responding to time requests in any of said plurality of processors with a system time value equal to the sum of said associated time base register means and said globally accessible time delta variable.

15. The computer program according to claim 14 additionally including:

means for initializing said associated time base register means upon system boot; and means for incrementing each said associated time base register means.

16. The computer program of claim 15 further including:

means for determining a value for said globally accessible time delta variable.

17. The computer program of claim 16 wherein said means for determining includes:

means active at system initialization for clearing said time delta variable.

18. The computer program of claim 17 wherein said means for determining additionally includes:

means, active when system time is to be changed, for calculating the difference between current time in said time base register means and an externally supplied time of day; and means for storing said difference in said time delta variable.

19. The computer program of claim 14 additionally comprising:

means for setting said time base register means only at system boot;

means for clearing said time delta variable at system boot; and means for altering only said time delta variable when a time change is desired across said system.

* * * * *